US010082379B2

(12) United States Patent
Kim

(10) Patent No.: US 10,082,379 B2
(45) Date of Patent: Sep. 25, 2018

(54) TAPE MEASURE HAVING LENGTH MARKING FUNCTION

(71) Applicant: Sang Yeoul Kim, Seoul (KR)

(72) Inventor: Sang Yeoul Kim, Seoul (KR)

( * ) Notice: Subject to any disclaimer, the term of this patent is extended or adjusted under 35 U.S.C. 154(b) by 130 days.

(21) Appl. No.: 15/319,799

(22) PCT Filed: Jun. 17, 2015

(86) PCT No.: PCT/KR2015/006114
§ 371 (c)(1),
(2) Date: Mar. 31, 2017

(87) PCT Pub. No.: WO2015/194841
PCT Pub. Date: Dec. 23, 2015

(65) Prior Publication Data
US 2017/0205218 A1  Jul. 20, 2017

(30) Foreign Application Priority Data

Jun. 17, 2014  (KR) .................. 20-2014-0004563 U

(51) Int. Cl.
*G01B 3/10* (2006.01)
(52) U.S. Cl.
CPC ......... *G01B 3/1084* (2013.01); *G01B 3/1005* (2013.01); *G01B 3/1041* (2013.01);
(Continued)
(58) Field of Classification Search
CPC .... G01B 2003/1007; G01B 2003/1053; G01B 2003/1089; G01B 3/1005; G01B 3/1041;
(Continued)

(56) References Cited

U.S. PATENT DOCUMENTS 2,807,886 A * 10/1957 Aciego ................ G01B 3/1084
33/572
5,577,329 A * 11/1996 States .................. G01B 3/1084
33/668
(Continued)

FOREIGN PATENT DOCUMENTS

JP        08-014804 A    1/1996
JP     2006-242661 A    9/2006
(Continued)

OTHER PUBLICATIONS

International Search Report for PCT/KR2015/006114 dated Jul. 13, 2015 from Korean Intellectual Property Office.

*Primary Examiner* — Yaritza Guadalupe-McCall
(74) *Attorney, Agent, or Firm* — Revolution IP, PLLC

(57) ABSTRACT

Provided is a tape measure having a length marking function, in which a guide having a slide groove formed at a predetermined distance from a bottom vertically extending from a first side of the casing and an insertion gap spaced from the first side is integrally formed; a threaded hole is formed through a bottom of the guide; a locking ball partially protruding inside the guide, a compression spring elastically supporting the locking ball, and a wrench bolt preventing separation of the locking ball and the compression spring are disposed in the threaded hole; a marker is provided to mark a length of an object pointed by a scale on the metal tape drawn out from the casing.

3 Claims, 6 Drawing Sheets

(52) U.S. Cl.
CPC ......... *G01B 3/1056* (2013.01); *G01B 3/1082* (2013.01); *G01B 2003/1007* (2013.01); *G01B 2003/1053* (2013.01); *G01B 2003/1089* (2013.01)

(58) Field of Classification Search
CPC ... G01B 3/1056; G01B 3/1082; G01B 3/1084
USPC .................................................. 33/755–771
See application file for complete search history.

(56) References Cited

U.S. PATENT DOCUMENTS

| | | | | |
|---|---|---|---|---|
| 6,041,513 | A * | 3/2000 | Doak | B25H 7/04 33/668 |
| 6,434,854 | B1 * | 8/2002 | MacColl | G01B 3/1084 33/668 |
| 2001/0034953 | A1 * | 11/2001 | Cole, III | B43L 9/04 33/668 |
| 2002/0011006 | A1 * | 1/2002 | Smith | G01B 3/1084 33/668 |
| 2005/0268480 | A1 * | 12/2005 | Potter | G01B 3/1056 33/768 |
| 2011/0203127 | A1 * | 8/2011 | Mayfield | G01B 3/1071 33/768 |
| 2017/0205218 | A1 * | 7/2017 | Kim | G01B 3/1084 |

FOREIGN PATENT DOCUMENTS

| | | |
|---|---|---|
| JP | 2007-033251 A | 2/2007 |
| KR | 10-2010-0006191 A | 1/2010 |
| KR | 10-1398689 B1 | 5/2014 |

\* cited by examiner

[Fig. 1]
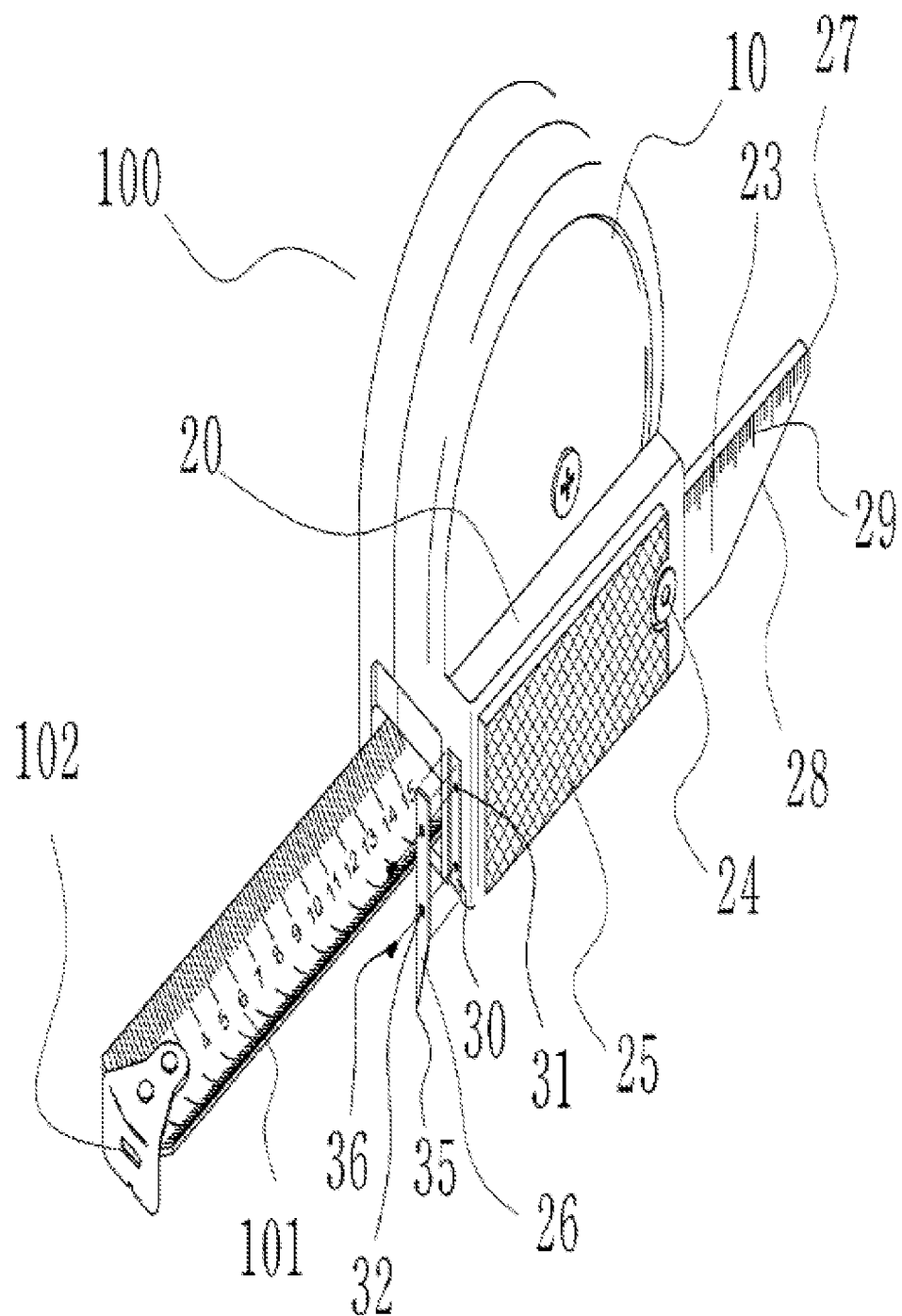

[Fig. 2]
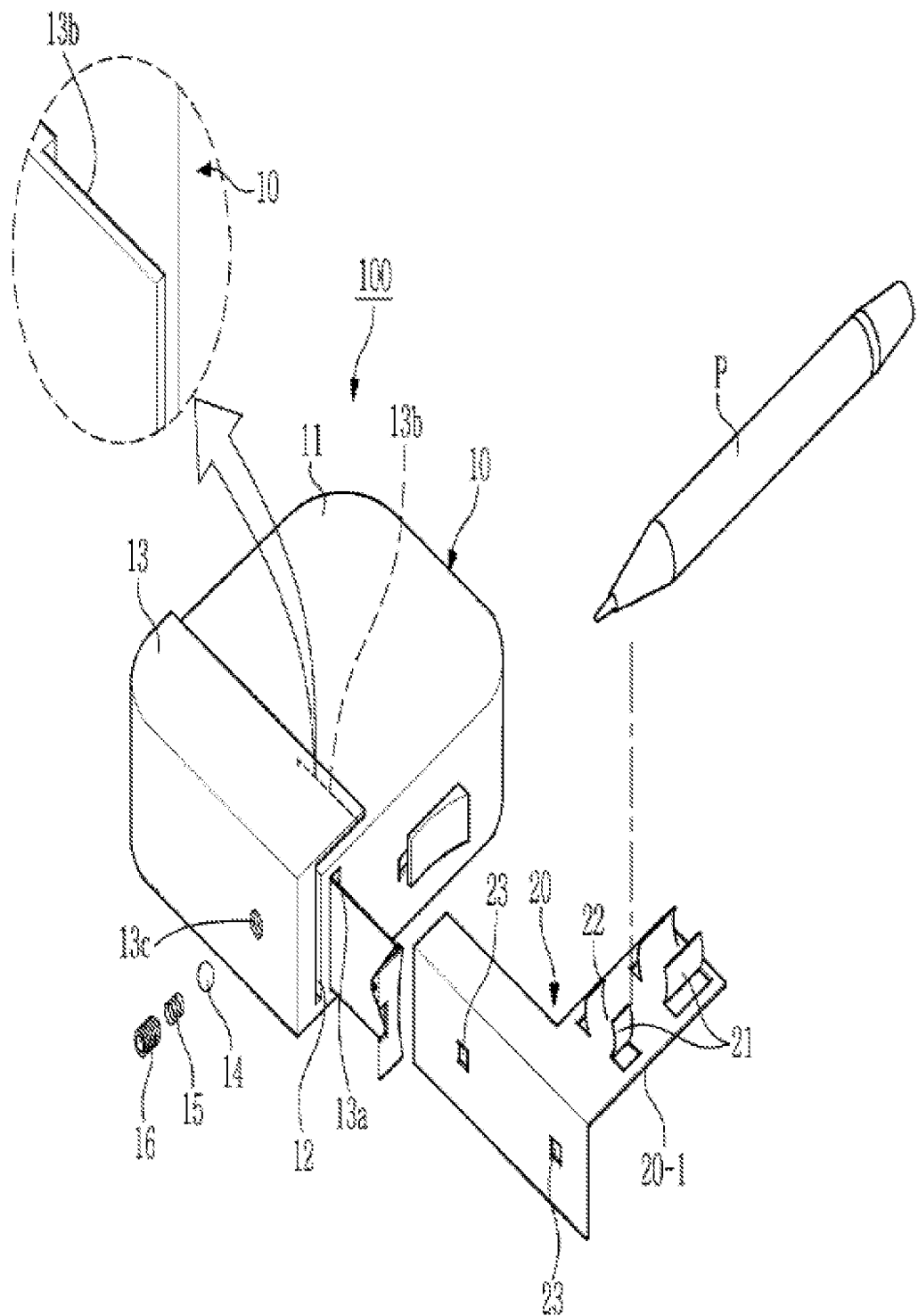

[Fig. 3]
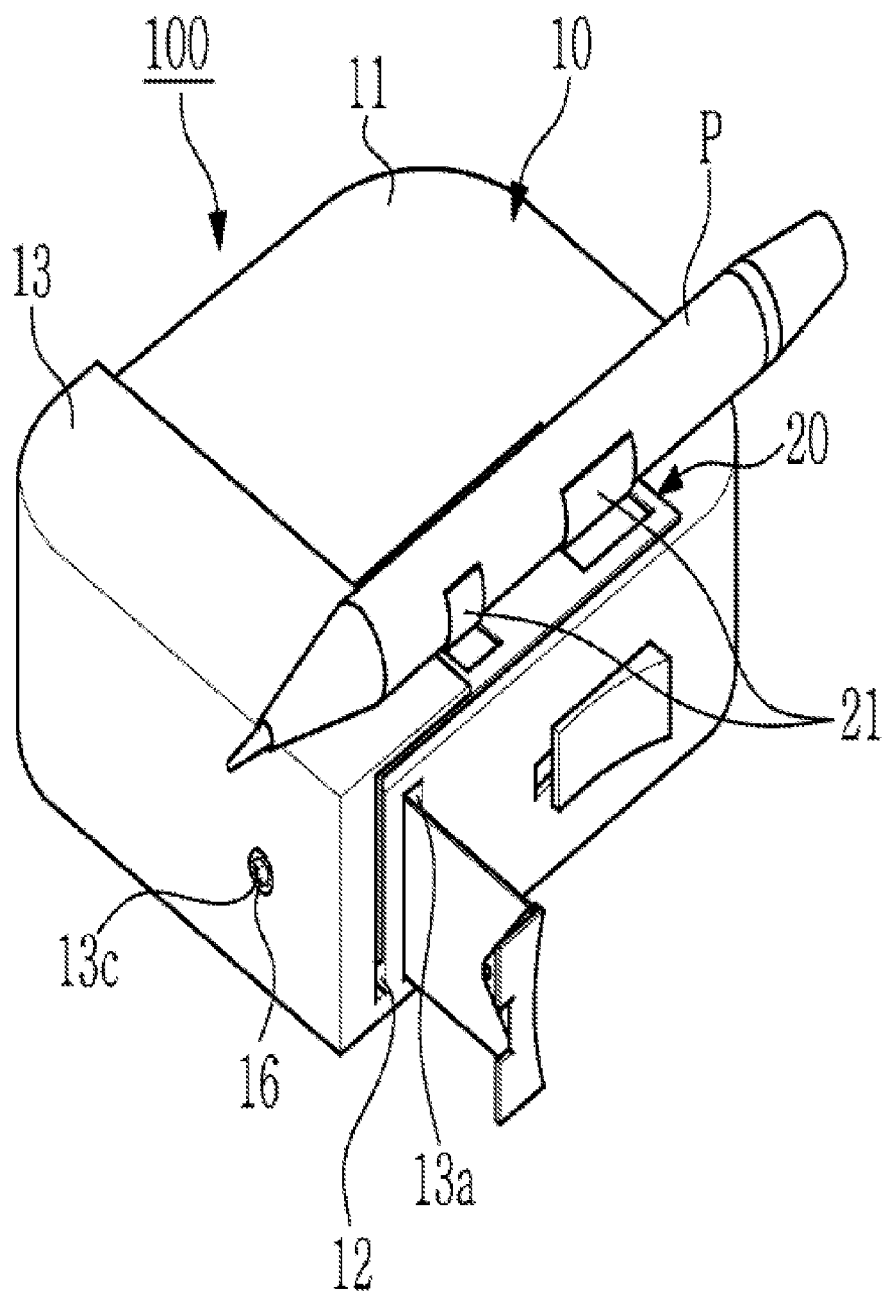

[Fig. 4]
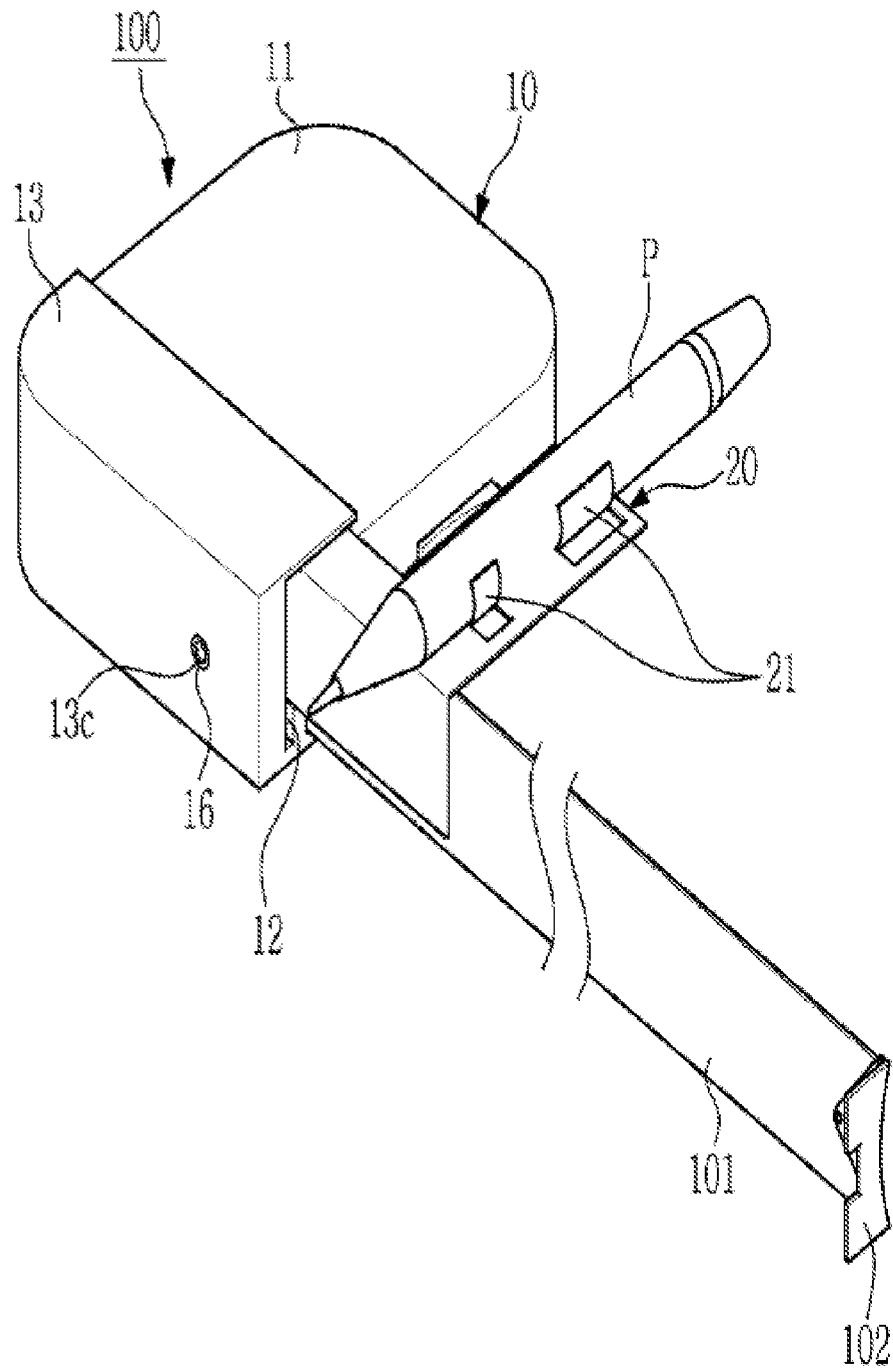

[Fig. 5]
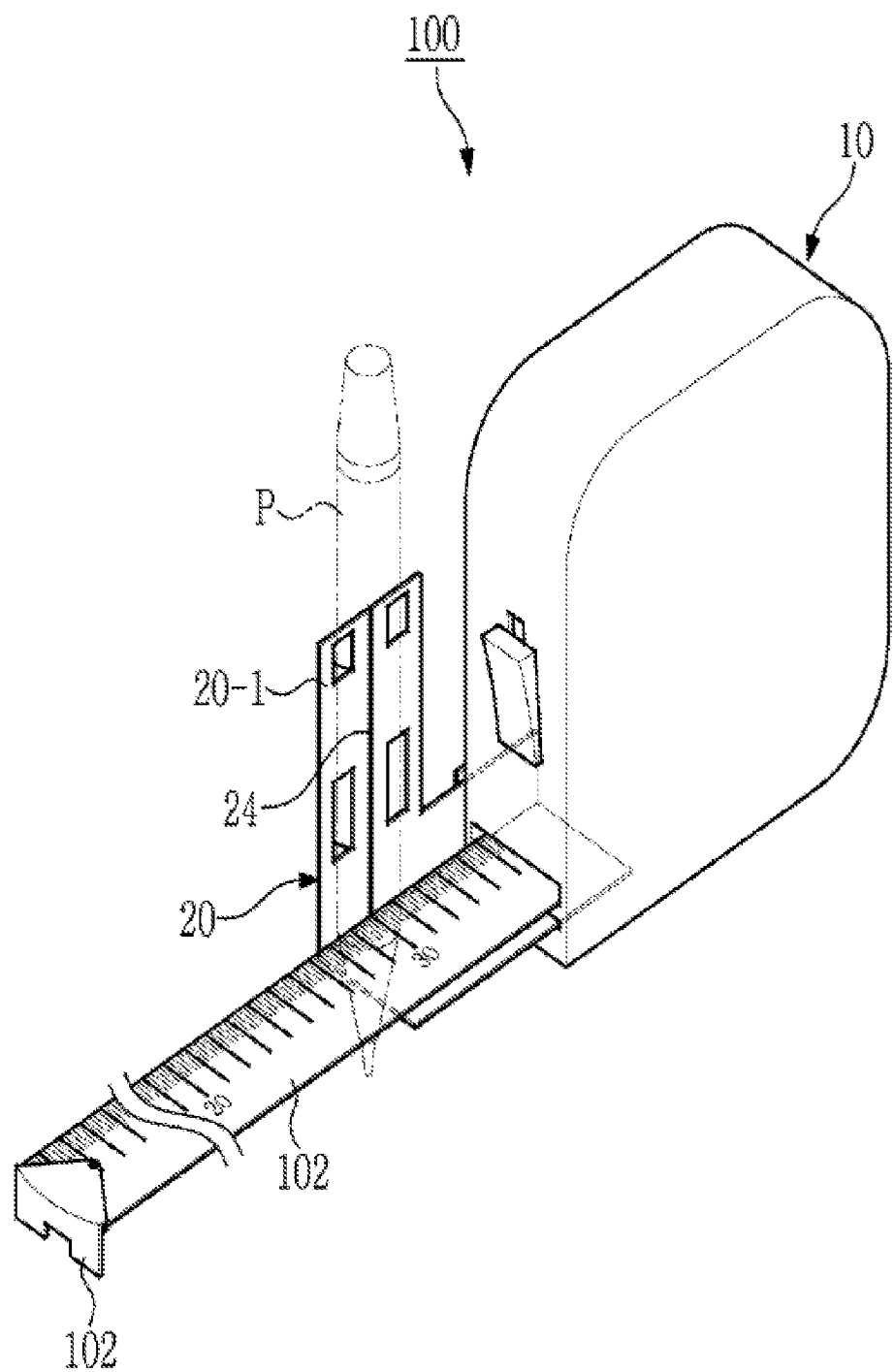

[Fig. 6]
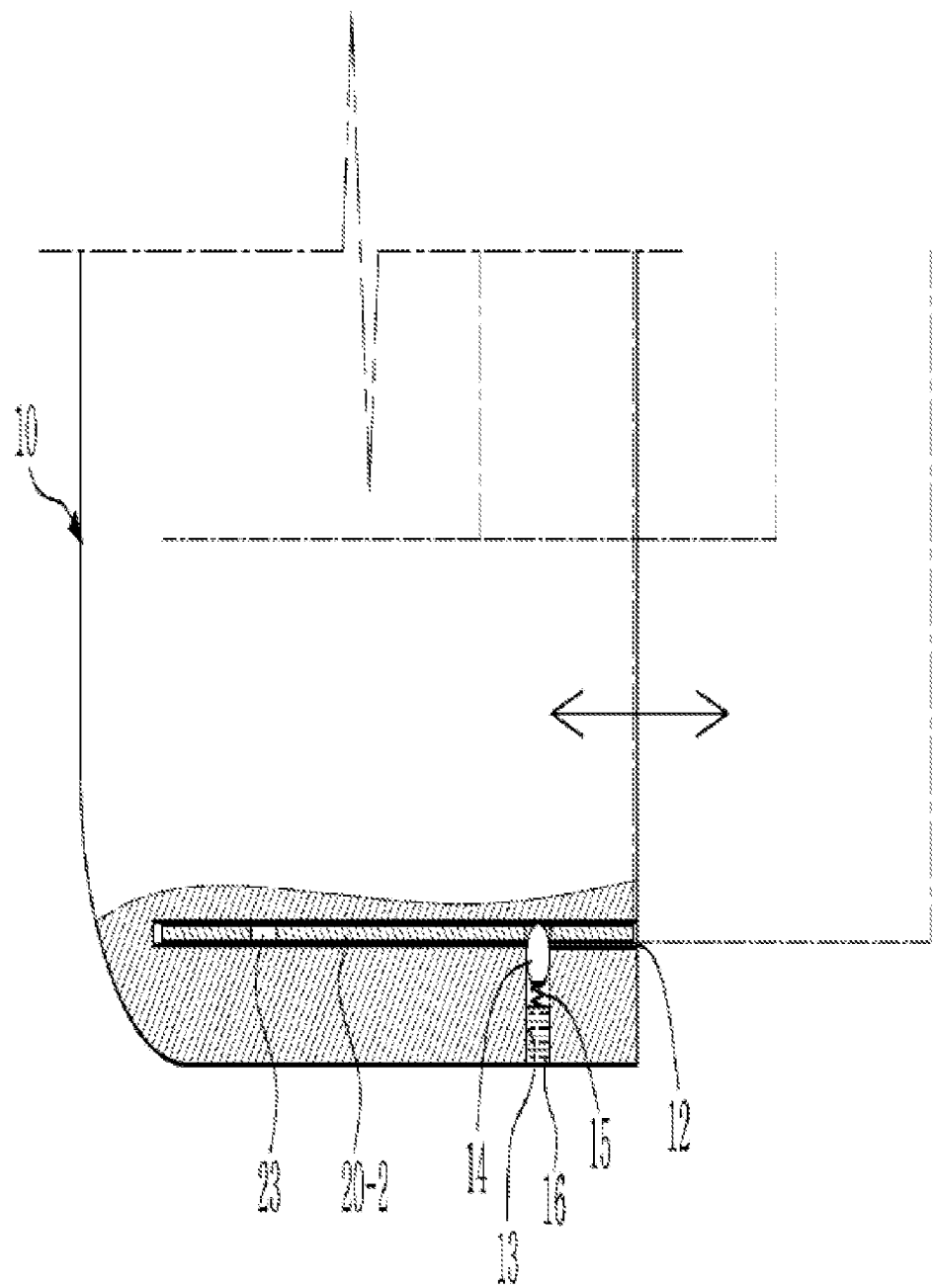

TAPE MEASURE HAVING LENGTH MARKING FUNCTION

TECHNICAL FIELD

The present invention relates to a tape measure and, more particularly, to a tape measure having a length marking function and allowing a user to measure the length of an object and mark the exact position of the measured point with one hand using the tape measure.

BACKGROUND ART

As well known in the art, tape measures are used for various purposes in construction and industrial fields, and are also used at home. Tape measures have a tape usually wound in the shape of a roll for the convenience of use and are used to measure the lengths of objects based on a scale on the tape or to mark cutting points of long products (e.g. subsidiary materials such as a wooden board or an iron material) by drawing out the tape by a predetermined distance from the body of the tape measures.

Workers in most work sites generally carry a variety of tools including the tape measure.

The tape of tape measures is drawn out for a user to mark desired positions on a target object with a felt-tip pen or a pencil and is pulled back into the body to be stowed.

There are tape measures that can measure and mark the lengths of objects in the related art and such a tape measure has been disclosed in Korean Patent No. 10-1398689 (titled, "Multipurpose improvement tape measure").

A tape measure 100 having a metal tape 101 for measuring a length, as shown in FIG. 1, is disclosed in the patent document, which is characterized by integrally forming a tool body 20 protruding from a side and formed at the lower potion of a side of a plastic outer case 10, a cutting plate 25 formed on a side of the tool body 200 by knurling, a marking blade 26 bolted in a groove 30 on the tool body 20 at a side of the inlet for the metal tape 101, and a cutter 23 having a chamfered end 27 and an inclined blade 28 at the lower end.

The metal tape has a hook 102 on the front end that is vertically bent and a scale 29 for measuring a depth is formed on the cutter.

The marking blade 26 has a first side vertically extending from the top to an end point 35 and a second side inclined toward the first side to be pointed to the end point 35 from a predetermined position, and coupling holes 32 are formed through the marking blade 26.

Since the marking blade 26 of the tape measures having the structure of the related art protrudes and is pointed and sharp, it is advantageous for marking the length of an object when measuring the object, but a user may be injured while handling the tape measure. Further, if the marking blade is bent or damaged, it should be replaced.

DISCLOSURE

Technical Problem

The present invention has been made in an effort to solve the problems in the related art and an object of the present invention is to provide a tape measure having a length marking function whereby a user can measure the length of an object and mark the exact position of the measured point with one hand using the tape measure.

Technical Solution

In order to achieve the objects of the present invention, a tape measure in which a metal tape is wound to be drawn in and out of a casing, except for the hook on the front end, is provided.

In the tape measure, a guide that has a slide groove formed at a predetermined distance from a bottom vertically extending from a first side of the casing and an insertion gap spaced from the first side is integrally formed; a threaded hole is formed through the bottom of the guide; a locking ball that partially protrudes inside the guide, a compression spring that elastically supports the locking ball, and a wrench bolt that prevents separation of the locking ball and the compression spring are disposed in the threaded hole; a marker is provided to mark the length of an object indicated by a scale on the metal tape drawn out from the casing while being guided at a side from the slide groove and the insertion gap of the guide.

The marker may have a vertical side and a horizontal side that are bent with respect to each other, holders in which a writing article can be inserted and a guide step of which a side is inserted in the insertion gap of the guide may be formed on the vertical side, and a plurality of support holes that is selectively fitted on the locking ball when being inserted into the slide groove of the guide may be formed through the horizontal side.

The holders on the vertical side may each have arc-shaped elastic wings corresponding to each other at both sides and a reference mark that is a reference for the scale on the metal tape may be provided on the rear side of the middle portion where the elastic wings are formed.

Advantageous Effects

According to the tape measure of the present invention, it is possible to take out the marker in the drawing-out direction of the metal tape from a side of the casing, mark a position corresponding to the length of an object by accurately aligning a writing article with a desired position of the scale on the metal tape, and put the marker back onto a side of the casing, so it is possible to draw out the metal tape and mark a length with one hand, and accordingly, it is possible to usefully use the tape measure. Further, if necessary, it is possible to use the tape measure in the same way as existing tape measures by completely separating the marker from the tape measure.

DESCRIPTION OF DRAWINGS

FIG. 1 is a perspective view showing main parts of a tape measure of the related art.

FIG. 2 is a perspective view showing a tape measure and a marker that are separated in the present invention.

FIG. 3 is a perspective view showing an assembly of the tape measure, the marker, and a writing article according to the present invention.

FIG. 4 is a perspective view showing the marker and a metal tape drawn out of the tape measure according to the present invention.

FIG. 5 is a rear perspective view of FIG. 4, seen from the opposite side.

FIG. 6 is an exemplary partial cross-sectional view in which a support hole of a horizontal side of the marker according to the present invention is supported and guided by a locking ball of a guide of the tape measure.

BEST MODE

Hereinafter, other objects and characteristics of the present invention except the objects described above will be made clear through the following description about embodiments referring to the accompanying drawings.

Unless otherwise defined, all terms including technical and scientific terms used herein have the same meaning as commonly understood by one of ordinary skill in the art to which the present invention belongs. It must be understood that the terms defined by the dictionary are identical with the meanings within the context of the related art, and they should not be ideally or excessively formally defined unless the context clearly dictates otherwise.

A tape measure according to an embodiment of the present invention is described hereafter in detail with reference to the accompanying drawings.

The present invention provides a common tape measure 100 in which a metal tape 101 is wound to be drawn in/out in a casing 10, except for a hook 102 on the font end.

According to the tape measure 100, a guide 13 that has a slide groove 13a formed at a predetermined distance from a bottom 12 vertically extending from a first side 11 of the casing 10 and an insertion gap 13b spaced from the first side is integrally formed; a threaded hole 13c is formed through the bottom of the guide 13; a locking ball 14 that partially protrudes inside the guide 13, a compression spring 15 that elastically supports the locking ball 14, and a wrench bolt 16 that prevents separation of the locking ball 14 and the compression spring 15 are disposed in the threaded hole 13c; a marker 20 is provided to mark the length of an object pointed by a scale on the metal tape 101 drawn out from the casing 10 while being guided at a side from the slide groove 13a and the insertion gap 13b of the guide 13.

The marker 20 has a vertical side 20-1 and a horizontal side 20-2 that are bent with respect to each other. Holders in which a writing article P can be inserted and a guide step 22 of which a side is inserted in the insertion gap 13b of the guide 13 are formed on the vertical side 20-1, and a plurality of support holes 23 that is selectively fitted on the locking ball 14 when being inserted into the slide groove 13a of the guide 13 is formed through the horizontal side 20-2.

The holders 21 on the vertical side 20-1 each have arc-shaped elastic wings corresponding to each other at both sides and a reference mark 24 that is a reference for the scale on the metal tape 101 is provided on the rear side of the middle portion where the elastic wings are formed.

The guide 13 may be made of the same synthetic resin as the casing 10 or may be separately formed in a metal plate and then applied in injection molding of the casing 10.

The reference mark 24 may be engraved straight or may be printed not to be erased.

The operation of the tape measure having this configuration of the present invention when it is used is described hereafter.

First, as the method of using a tape measure, it is possible to lock the hook 102 of the metal tape 101 to an object to be measured in length, draw out the metal tape by a desired length from the casing 10, and then measure the length or mark a position to be cut, etc.

A user takes out the marker 20 from the guide 13 when drawing out the metal tape 101, with the writing article P for marking, such as a pen or a pencil, in the holders 21 on the vertical side 20-1 of the marker 20 that can slide on the casing 10.

The marker 20 slides on the first side 11 and the bottom 12 of the casing 10. When the marker 20 is forcibly slid out of the slide groove 13a and the insertion gap 13b of the guide 13, a first support hole 23 of the horizontal side 20-2 is forcibly separated from the locking ball 14 in the threaded hole 13c of the guide 13, and, as shown in FIG. 6, a second support hole 23 is fitted on the locking ball 13, thereby fixing the marker 20.

The worker who uses the tape measure 100 draws out the metal tape 101 by a desired length and marks at a desired position of the scale with the writing article P.

In detail, in the process of marking that is described in more detail, the worker can align a desired position (for example, 30 cm) of the scale on the metal tape 101 with the reference mark 24 on the rear side of the vertical side 20-1 of the marker 20 and then mark a position by placing a dot or drawing a visible line using the aligned writing point of the writing article P by pressing down the writing article P.

In this process, the worker can put the hook 102 of the metal tape 101 on the end of an object, draw out the metal tape wound in the casing 10 by a desired length by pulling the tape, making sure that a desired position on the scale and the reference mark 24 are aligned, and then mark a position (a length) using his/her thumb and index finger while holding the tape measure.

Accordingly, the tape measure 100 provides convenience, as compared with common existing tape measures from which a user draws out a metal tape by hand, and marks a desired position with a separated marking pen or a writing article in the other hand.

After the worker marks a position in this way or the tape measure is not used, in the same way of using common tape measure, the metal tape is drawn back in to the casing and slides the marker inside the guide on the casing. In this process, the first support hole 23 of the horizontal side 20-2 of the marker is fitted on the locking ball 14.

In addition to detachably attaching the writing article P to the marker 20, it is also possible to completely separate the marker 20 from the casing 10, so it is possible to separate and then use the marker 20, if necessary.

Hereinabove, although the present invention is described by specific matters such as concrete components, and the like, embodiments, and drawings, they are provided only for assisting in the entire understanding of the present invention. Therefore, the present invention is not limited to the embodiments. Various modifications and changes may be made by those skilled in the art to which the present invention pertains from this description.

Therefore, the sprit of the present invention should not be limited to the above-described embodiment, and the following claims as well as all modified equally or equivalently to the claims are intended to fall within the scope and spirit of the invention.

The invention claimed is:

1. A tape measure (100) in which a metal tape (101) is wound to be drawn in and out in a casing (10), except for a hook (102) on a front end, wherein a guide (13) having a slide groove (13a) formed at a predetermined distance from a bottom (12) vertically extending from a first side (11) of the casing (10) and an insertion gap (13b) spaced from the first side is integrally formed; a threaded hole (13c) is formed through a bottom of the guide (13); a locking ball (14) partially protruding inside the guide (13), a compression spring (15) elastically supporting the locking ball (14), and a wrench bolt (16) preventing separation of the locking ball (14) and the compression spring (15) are disposed in the threaded hole (13c); a marker (20) is provided to mark a length of an object indicated by a scale on the metal tape (101) drawn out from the casing (10) while being guided at a side from the slide groove (13*a*) and the insertion gap (13*b*) of the guide (13).

2. The tape measure of claim 1, wherein the marker (20) has a vertical side (20-1) and a horizontal side (20-2) that are bent with respect to each other, holders in which a writing article (P) is inserted and a guide step (22) of which a side is inserted in the insertion gap (13*b*) of the guide (13) are formed on the vertical side (20-1), and a plurality of support holes 23 that is selectively fitted on the locking ball (14) when being inserted into the slide groove (13*a*) of the guide (13) is formed through the horizontal side (20-2).

3. The tape measure of claim 1, wherein the holders (21) on the vertical side (20-1) each have arc-shaped elastic wings corresponding to each other at both sides, and a reference mark (24) that is a reference for the scale on the metal tape (101) is provided on a rear side of a middle portion where the elastic wings are formed.

\* \* \* \* \*